US011308666B2

(12) United States Patent
Akimoto et al.

(10) Patent No.: US 11,308,666 B2
(45) Date of Patent: Apr. 19, 2022

(54) EVENT PROCESS DATA INTEGRATION AND ANALYSIS APPARATUS, AND EVENT PROCESS DATA INTEGRATION AND ANALYSIS METHOD

(71) Applicant: YOKOGAWA ELECTRIC CORPORATION, Musashino (JP)

(72) Inventors: Ayako Akimoto, Musashino (JP); Yuichi Sakuraba, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/903,752

(22) Filed: Jun. 17, 2020

(65) Prior Publication Data

US 2020/0402276 A1 Dec. 24, 2020

(30) Foreign Application Priority Data

Jun. 24, 2019 (JP) ............................ JP2019-116695

(51) Int. Cl.
*G06T 11/20* (2006.01)
*G06F 11/34* (2006.01)

(52) U.S. Cl.
CPC ........ *G06T 11/206* (2013.01); *G06F 11/3438* (2013.01); *G06F 2201/86* (2013.01); *G06T 11/203* (2013.01); *G06T 2200/24* (2013.01)

(58) Field of Classification Search
None
See application file for complete search history.

(56) References Cited

U.S. PATENT DOCUMENTS

2005/0021245 A1* 1/2005 Furuno .................. G06Q 10/10 702/33
2013/0131883 A1* 5/2013 Yamada .............. H02J 13/0075 700/295
2014/0075380 A1* 3/2014 Milirud ................ G06F 11/323 715/810
2015/0347076 A1* 12/2015 Terada ...................... H02J 3/00 345/1.1
2018/0321350 A1* 11/2018 Marshall .............. G01R 21/133
2019/0221037 A1* 7/2019 Sugaya .................. B25J 9/1671

FOREIGN PATENT DOCUMENTS

JP 2008140110 A 6/2008
JP 2009009399 A 1/2009
JP 2017-91178 A 5/2017
JP 2017091114 A 5/2017

* cited by examiner

*Primary Examiner* — Jeffrey J Chow
(74) *Attorney, Agent, or Firm* — Westerman, Hattori, Daniels & Adrian, LLP

(57) ABSTRACT

An event process data integration and analysis apparatus of the present disclosure includes an integrated display output interface. The integrated display output interface generates, based on unit operation data, a unit operation band for each device among a plurality of devices, the unit operation band representing an operation intention of an operator and being arranged in a time series. The integrated display output interface generates, based on process data, a process trend chart for each device, the process trend chart representing a change over time in a process value. The integrated display output interface generates an integrated display that displays the unit operation band and the process trend chart associated by time.

10 Claims, 7 Drawing Sheets

Before OR combination
T001. PV
31
30a
P002. PV
32
F001
33a
33b
33c
F002
34a
34c
AND combination
OR combination
After OR combination
T001. PV
31
30b
P002. PV
32
F001&F002
35a
35b
35c 1
Event process data integration and analysis apparatus
11
Event data analyzer
111
Basic unit operation analyzer
112
Unit operation analyzer
13
Integrated display output interface
14
Display apparatus
12
Process data analyzer
15
Event log database
16
Historian database 20
21
22
23a
23b
24
25
26
27
28
T001. PV
P002. PV
F001
T002
T002. MODE
AUTO
MAN
T002. SV
T002. MV
T003

2
Event process data integration and analysis apparatus
15
Event log database
Event data analyzer
11
Basic unit operation analyzer
111
Unit operation analyzer
112
17
18
Unit operation reanalyzer
Input apparatus
Integrated display output interface
Display apparatus
13
14
16
Historian database
Process data analyzer
12

Before OR combination
T001. PV
P002. PV
F001
F002
30a
31
32
33a
33b
33c
34a
34c
AND combination
OR combination
After OR combination
T001. PV
P002. PV
F001&F002
30b
31
32
35a
35b
35c 40a
Before AND combination
T001.PV
P002.PV
F001
F002
41
42
43a
43b
43c
44a
44c
AND combination
OR combination
40b
After AND combination
T001.PV
P002.PV
F001&F002
41
42
45a
45b
45c
(2)
(1)
*(2)

EVENT PROCESS DATA INTEGRATION AND ANALYSIS APPARATUS, AND EVENT PROCESS DATA INTEGRATION AND ANALYSIS METHOD

CROSS-REFERENCE TO RELATED APPLICATION

The present application claims priority to and the benefit of Japanese Patent Application No. 2019-116695 filed Jun. 24, 2019 the entire contents of which are incorporated herein by reference.

TECHNICAL FIELD

The present disclosure relates to an event process data integration and analysis apparatus and an event process data integration and analysis method.

BACKGROUND

In a control system such as a distributed control system (DCS), operations and the like by an operator are handled as events, and an event management system (for example, a consolidated alarm management software (CAMS) for HIS, produced by Yokogawa Electric Corporation) records the events as an event log. On the other hand, process data such as the flow, pressure, and temperature of a plant is also collected periodically by the control system and is stored in a historian database (such as Exaquantum® produced by Yokogawa Electric Corporation; Exaquantum is a registered trademark in Japan, other countries, or both) or the like by a historian.

Normally, plant operations are automated, but many operations are manually performed by the operator during non-routine work such as starting up or shutting off the plant, cleaning, and switching apparatuses. The operating procedures during such non-routine work are listed in standard operating procedures (SOP). Detailed operating procedures are often not listed in the SOP, however, and are often left up to the skill of the operator. Hence, the work time, quality, and the like often vary by operator during non-routine work.

Event data recorded in the event log is used to analyze operations by an operator. In general, an operator typically does not perform device operations once, but rather multiple times. For example, the operator will often perform control by repeating an operation to change a process value of a device gradually so that the process value reaches a set variable. An event log is generated for each operation in this case. It therefore becomes necessary to analyze operations by the operator without focusing only on individual operations recorded as event data, but rather by analyzing operations collectively to some degree.

Patent literature (PTL) 1 proposes analyzing operations by an operator by extracting from an event log generated for individual operations by the operator, the operation intention of the operator for a series of operations in the event log and displaying the series of operations as a flowchart.

CITATION LIST

Patent Literature

PTL 1: JP2017-91178A

SUMMARY

An event process data integration and analysis apparatus according to an embodiment includes an integrated display output interface configured to generate, based on unit operation data, a unit operation band for each device among a plurality of devices, the unit operation band representing an operation intention of an operator and being arranged in a time series; to generate, based on process data, a process trend chart for each device, the process trend chart representing a change over time in a process value; and to generate an integrated display that displays the unit operation band and the process trend chart associated by time.

DETAILED DESCRIPTION

Figure 1:
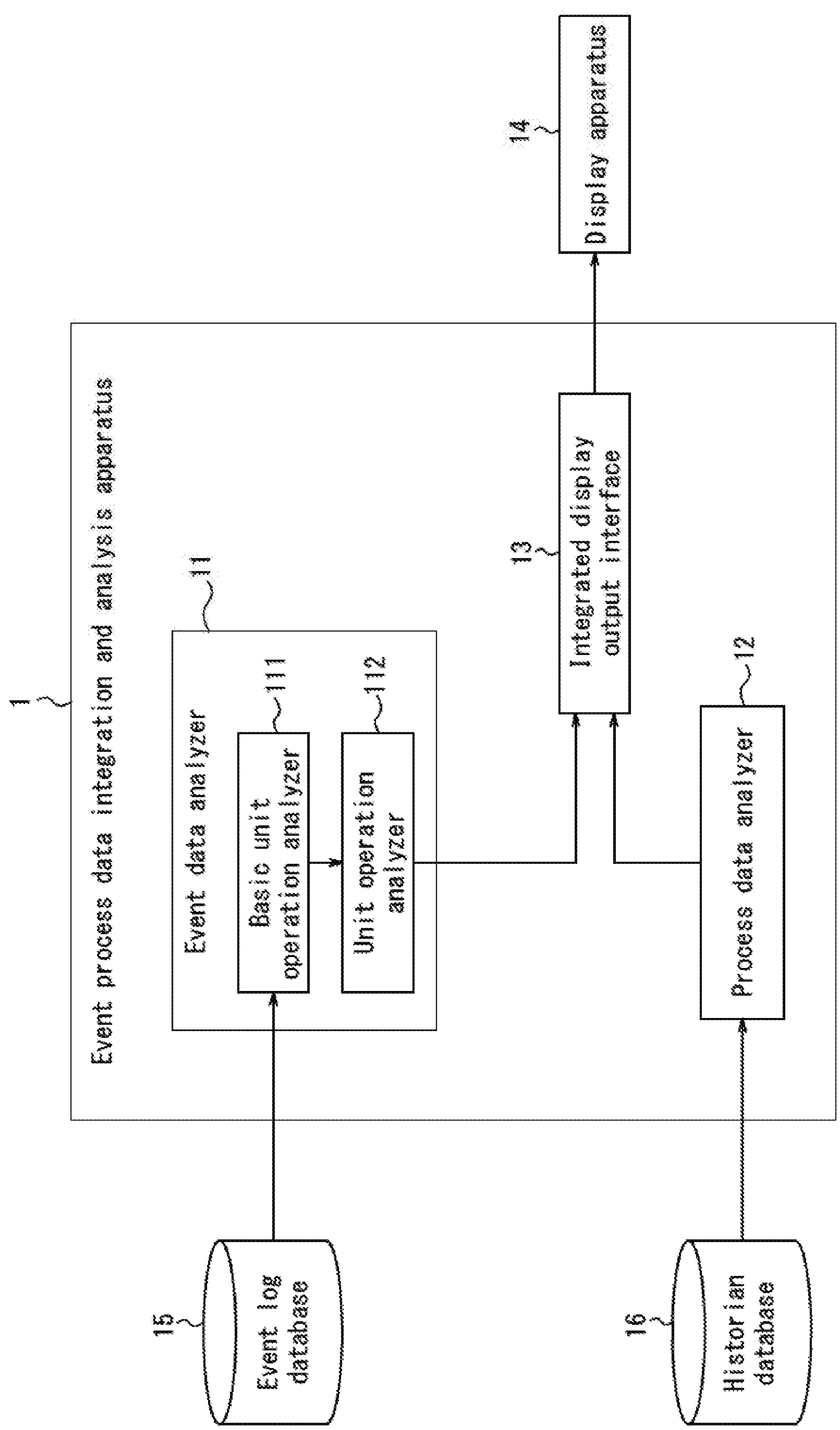
FIG. 1 is a functional block diagram illustrating the functions of an event process data integration and analysis apparatus according to a first embodiment.

Operations by an operator are closely related to changes in process values. For example, when a process value exhibits an abnormal value, the operator performs an operation to return the process value to a normal value. Conversely, a process value may become unstable and vary due to operation by the operator. It thus becomes necessary to analyze both event data and process data to improve operation of a plant or the like.

PTL 1 uses a flowchart to visualize operations by an operator, thereby enabling a rough understanding of the operations by the operator. It is difficult, however, to determine the correspondence between operations by the operator in the flowchart and variations in the process values within the process data. In other words, techniques for displaying information related to operations by an operator and variation in process values have room for improvement.

It could therefore be helpful to provide an event process data integration and analysis apparatus and an event process data integration and analysis method that can improve the convenience of a technique for displaying information related to operations by an operator and variation in process values.

An event process data integration and analysis apparatus according to an embodiment includes an integrated display output interface configured to generate, based on unit operation data, a unit operation band for each device among a plurality of devices, the unit operation band representing an operation intention of an operator and being arranged in a time series; to generate, based on process data, a process trend chart for each device, the process trend chart representing a change over time in a process value; and to generate an integrated display that displays the unit operation band and the process trend chart associated by time.

The integrated display output interface associates the unit operation band and the process trend chart by time in this way, enabling a clear understanding of the relationship between operations by the operator and changes in process values. For example, this facilitates improved operation of a plant or the like.

In an embodiment, the integrated display output interface may be configured to generate, based on the unit operation data, an operation trend chart for each device, the operation trend chart representing a change over time in operations by the operator, and to generate the integrated display to include the unit operation band, the operation trend chart, and the process trend chart associated by time.

The integrated display output interface generates the operation trend chart in this way, enabling a clear understanding of the operations, by the operator, that form the unit operations.

In an embodiment, the integrated display output interface may be configured to generate a combined unit operation band by arranging the unit operation bands of the devices together in one lane and to generate an integrated display including the combined unit operation band.

The unit operation bands of devices are grouped together in this way, improving convenience for the user.

In an embodiment, the integrated display output interface may be configured to generate the combined unit operation band by arranging the unit operation bands of the devices in overlap in one lane.

The unit operation bands of the devices are thus arranged in overlap in one lane, enabling a rough understanding of whether a particular operation has been performed on a plurality of devices.

In an embodiment, the event process data integration and analysis apparatus may further include a unit operation reanalyzer configured to select simultaneous unit operation bands from among the unit operation bands of the devices, and the integrated display output interface may be configured to generate the combined unit operation band by arranging the selected unit operation bands in combination in one lane.

In this way, the unit operation reanalyzer is further included, and simultaneous unit operation bands are selected, combined, and arranged in one lane. This enables an understanding of whether a certain operation that should be performed simultaneously on a plurality of devices has actually been performed on the devices.

In an embodiment, the unit operation reanalyzer may be configured to analyze a device count of the selected unit operation bands and the operation intention represented by the selected unit operation bands, and the integrated display output interface may be configured to append the device count and the operation intention to the combined unit operation band based on the result of analysis by the unit operation reanalyzer.

The device count and the operation intention are appended to the combined unit operation band in this way, enabling a clear understanding of lacking operations and of differences in operation intention.

In an embodiment, the event process data integration and analysis apparatus may further include an event data analyzer configured to extract the unit operation data based on an event log including an operation history of the operator.

In an embodiment, the event process data integration and analysis apparatus may further include a process data analyzer configured to extract the process data based on a historian including a history of the process value.

An event process data integration and analysis method according to an embodiment includes using an integrated display output interface to generate, based on unit operation data, a unit operation band for each device among a plurality of devices, the unit operation band representing an operation intention of an operator and being arranged in a time series, to generate, based on process data, a process trend chart for each device, the process trend chart representing a change over time in a process value; and to generate an integrated display that displays the unit operation band and the process trend chart associated by time.

The unit operation band and the process trend chart are associated by time in this way, enabling a clear understanding of the relationship between operations by the operator and changes in process values. For example, this facilitates improved operation of a plant or the like.

The present disclosure can provide an event process data integration and analysis apparatus and an event process data integration and analysis method that can improve the convenience of a technique for displaying information related to operations by an operator and variation in process values.

Embodiments of the present disclosure are described below with reference to the drawings. Identical reference signs in the drawings indicate identical or equivalent constituent elements.

First Embodiment

As illustrated in FIG. 1, an event process data integration and analysis apparatus 1 according to a first embodiment of the present disclosure includes an event data analyzer 11, a process data analyzer 12, and in integrated display output interface 13.

The event data analyzer 11, the process data analyzer 12, and the integrated display output interface 13 can each include a processing apparatus such as a central processing unit (CPU). The event data analyzer 11, the process data analyzer 12, and the integrated display output interface 13 can each include various memories capable of storing programs and data necessary for the processing apparatus to operate. Examples of the memory include read only memory (ROM), flash memory, and dynamic random access memory (DRAM), which is capable of temporarily storing data. The event data analyzer 11, the process data analyzer 12, and the integrated display output interface 13 can thereby execute the programs.

In general, the operator performs an operation to increase or decrease a set variable (SV), a manipulated variable (MV), or the like so that a process value such as flow, pressure, or temperature increases or decreases. The operator also performs operations such as minutely adjusting a process value such as flow, pressure, or temperature to maintain the process value constant. Here, the operator may change a process value by ramping to change an SV or MV gradually or change a process value by changing an SV or MV with a one-time operation. When the operator has the intention of changing a process value, multiple operation methods thus exist for the operator to change the process value. The event data analyzer 11 extracts the operation intention of the operator and the operation method of the operator. The event data analyzer 11 is described below.

The event data analyzer 11 acquires event data that includes an operation history of an operator from an event log database 15, for example. The event data analyzer 11 extracts basic unit operation data, which includes an operation method of the operator with respect to a device, based on the acquired event data. The event data analyzer 11 also extracts unit operation data, which includes an operation intention of the operator, based on the extracted basic unit operation data. The event data analyzer 11 transmits the extracted basic unit operation data and unit operation data to the integrated display output interface 13. A method of extracting basic unit operation data and unit operation data is described, below for an example in which the event data analyzer 11 includes a basic unit operation analyzer 111 and a unit operation analyzer 112.

The basic unit operation analyzer 111 first acquires event log data from the event log database 15. The basic unit operation analyzer 111 then infers the operation method of the operator based on the acquired event log data and extracts basic unit operation data. The basic unit operation analyzer 111 then transmits the extracted basic unit operation data to the unit operation analyzer 112.

The basic unit operation data described above can, for example, include a basic unit operation ID, a start time, an end time, a tag name, an operation method, and an event ID. The "basic unit operation ID" is an identifier for identifying each basic unit operation. The "start time" is the start time of each basic unit operation. The "end time" is the end time of each basic unit operation. The "tag name" is an identifier for identifying the device that generated the event log. The "operation method" includes a change in operation mode (automatic or manual), a one-time change of a set variable (increase or decrease), a change of a manipulated variable by ramping (increase or decrease), a minute adjustment to a manipulated variable, or the like. The "event ID" is the event ID of each event log included in the basic unit operation. The basic unit operation data is not, however, limited to these examples.

The unit operation analyzer 112 then acquires the basic unit operation data extracted by the basic unit operation analyzer 111. Next, the unit operation analyzer 112 infers the operation intention of the operator based on the acquired basic unit operation data and extracts unit operation data. Next, the unit operation analyzer 112 transmits the extracted unit operation data to the integrated display output interface 13. In the present disclosure, the extracted unit operations are not displayed as a flowchart.

The unit operation data described above can, for example, include a unit operation ID, a start time, an end time, a tag name, an operation intention, and basic unit operation IDs. The "unit operation ID" is an identifier for identifying each unit operation. The "start time" is the start time of each unit operation. The "end time" is the end time of each unit operation. The "tag name" is an identifier for identifying the device that generated the event log. The "operation intention" is information indicating the intention of the operation performed by the operator. In greater detail, this information can include "increase", "decrease", "minute adjustment", and the like, for example. The "basic unit operation IDs" include the basic unit operation IDs of the basic unit operations included in the unit operation. The unit operation data is not, however, limited to these examples.

The process data analyzer 12 acquires process data that includes process values of a device from a historian database 16, for example. The process data analyzer 12 transmits the acquired process data to the integrated display output interface 13.

Based on the unit operation data received from the event data analyzer 11, the integrated display output interface 13 generates a unit operation band, for each device, that represents the operation intention of the operator and is arranged in a time series. The "unit operation band" as referred to here is a display object included in the integrated display described below. The unit operation band includes information indicating the operation intention of the operator and information indicating the start time, the duration, and the end time of a unit operation. The unit operation band may, for example, be displayed as a rectangle. In this case, the size (width) of the rectangle can represent the information indicating the start time, the duration, and the end time of a unit operation. A symbol or the like inside the rectangle can represent the information indicating the operation intention. For example, the symbols inside the rectangle include an up arrow to indicate "increase", a down arrow to indicate "decrease", and a right arrow to indicate "minute adjustment".

Based on the unit operation data received from the event data analyzer 11, the integrated display output interface 13 generates an operation trend chart, for each device, that represents the change over time in operations by the operator. The "operation trend chart" can, for example, be a line graph.

Based on the process data received from the process data analyzer 12, the integrated display output interface 13 generates a process trend chart, for each device, representing the change over time in a process value. The "process trend chart" can, for example, be a line graph.

The integrated display output interface 13 generates an integrated display that displays the unit operation bands, the operation trend charts, and the process trend charts associated by time. For example, the integrated display output interface 13 can match the time axes of the unit operation bands and the process trend charts to display these on the same time axis. With known collection methods (polling or event driven) and differences in the purpose and properties of data (continuous values representing physical quantities or discrete values representing the manipulated variables of the operator), unit operation data and process data have not been collected on separate systems and used together in this way.

The integrated display output interface 13 outputs the generated integrated display to a display apparatus 14. Details of the unit operation band, the operation trend chart, and the process trend chart are provided below with reference to FIG. 2.

The display apparatus 14 can include a display, such as a liquid crystal display or an organic electroluminescence (EL) display. However, the method of outputting the integrated display generated by the integrated display output interface 13 is not limited to a method of outputting by displaying the integrated display on the display apparatus 14.

Figure 2:
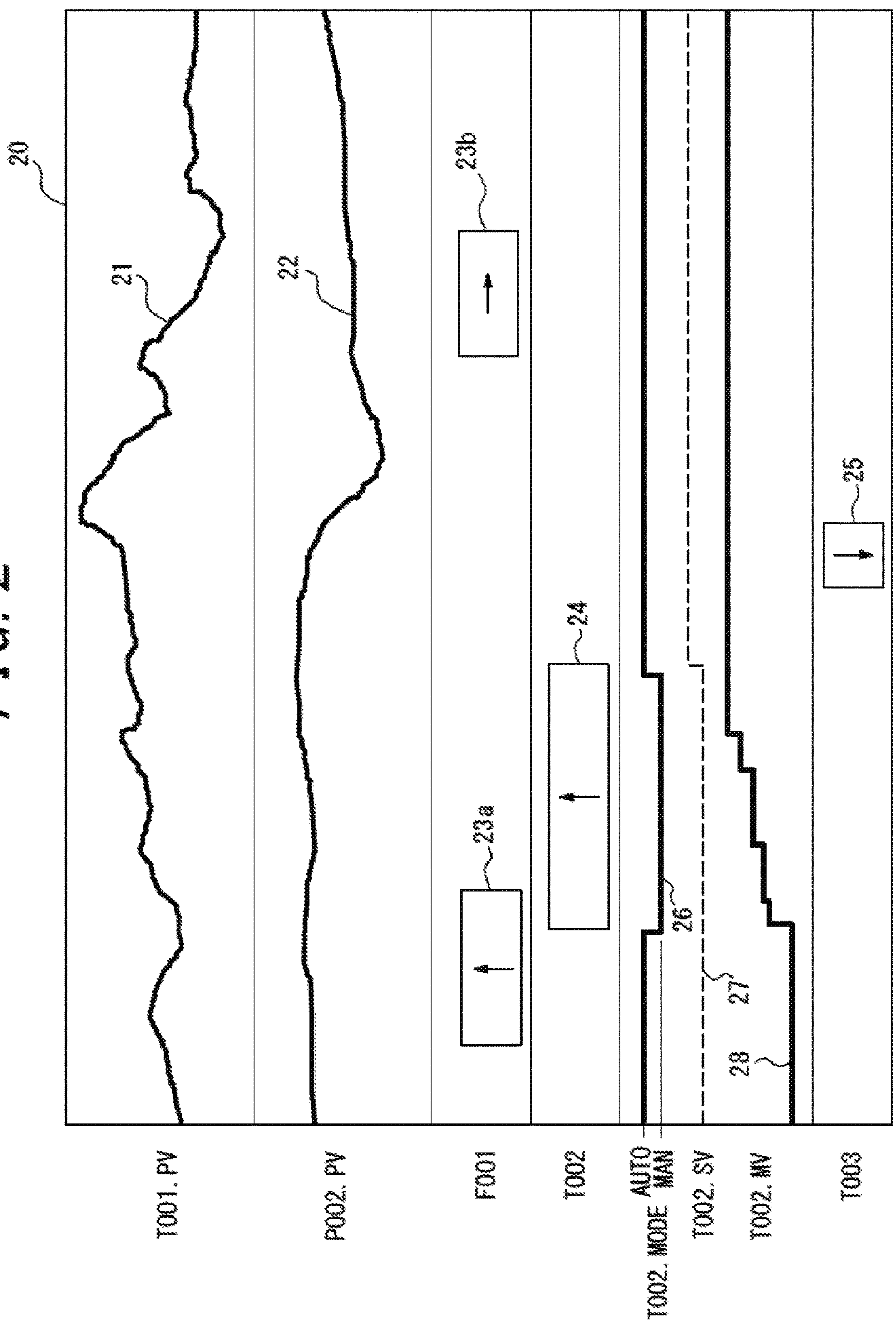
FIG. 2 illustrates an example of an integrated display generated by the event process data integration and analysis apparatus of FIG. 1.

An example of an integrated display 20 generated by the integrated display output interface 13 is described with reference to FIG. 2. In FIG. 2, "T" represents temperature, "P" represents pressure, "F" represents flow, "PV" represents process value, and the horizontal axis corresponds to the time axis. The integrated display 20 can include a plurality of lanes for displaying process trend charts 21, 22, unit operation bands 23*a*, 23*b*, 24, 25, and operation trend charts 26, 27, 28.

The process trend chart 2.1 displayed in the lane (T001.PV) represents the change over time in a process value (temperature) of the device (T001). The "device (T001)" indicates the device whose tag name is "T001". The process trend chart 22 displayed in the lane (P002.PV) represents the change over time in a process value (pressure) of the device (P002).

The unit operation bands 23$a$, 23$b$ included in the lane (F001) indicate that a unit operation whose operation intention is "up arrow" (increase) and a unit operation whose operation intention is "right arrow" (minute adjustment) were performed on the device (F001) in this order in time. The unit operation band 24 included in the lane (T002) indicates that the unit operation whose operation intention is "up arrow" was performed on the device (T002). The unit operation band 25 included in the lane (T003) indicates that the unit operation whose operation intention is "down arrow" (decrease) was performed on the device (T003).

When the user (analyst) selects the lane of a unit operation band included in the integrated display 20 on the screen of the display apparatus 14, one or more operation trend charts related to the device (tag name) of the selected lane are displayed. FIG. 2 illustrates the case of the lane (T002) being selected and three types of operation trend charts 26, 27, 28 (operation mode, set variable, and manipulated variable) being displayed. The operation trend chart 26 of T002.MODE represents the change over time in the operation mode, i.e. "AUTO" (automatic) or "MAN" (manual), of the device (T002). The operation trend chart 27 of T002.SV represents the change over time in the set variable (SV) of the device (T002). The operation trend chart 28 of T002.MV represents the change over time in the manipulated variable (MV) of the device (T002). In this way, the user can grasp that on the device (T002), unit operations were performed to change the operation mode from automatic to manual, then to change the manipulated variable manually multiple times, and then to change the operation mode from manual to automatic, thereby obtaining the set variable. In other words, the user can easily grasp the operations by the operator that form unit operations.

The operator normally changes one of the operation mode, the set variable, and the manipulated variable. FIG. 2 therefore illustrates an example in which three types (T002.MODE, T002.SV, T002.MV) of operation trend charts 26, 27, 28 are displayed. The types of operation trend charts that are displayed are not, however, limited these. The operation trend charts 26, 27, 28 plot the values before and after a change due to an operation by the operator at the same time and are therefore step-like in FIG. 2. The display method is not, however, limited to this example.

Figure 3:
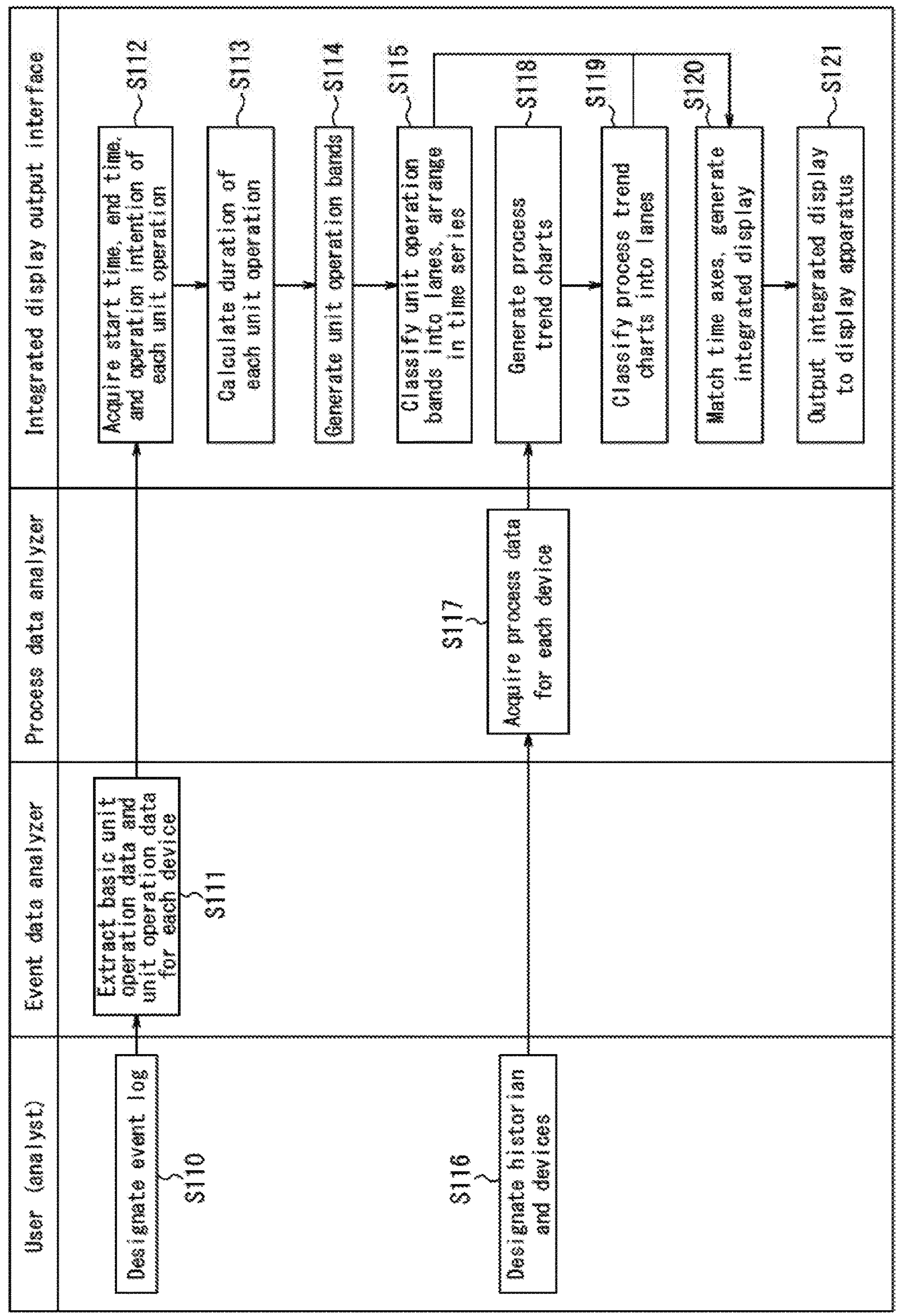
FIG. 3 is a flowchart illustrating an example of processing by the event process data integration and analysis apparatus of FIG. 1.

Next, an example of processing by the event process data integration and analysis apparatus 1 according to the present embodiment is described in detail with reference to FIG. 3.

In step S110, the user (analyst) designates the event log to be analyzed. Step S110 may be performed as appropriate via an input apparatus, for example.

Subsequently, in step S111, the event data analyzer 11 extracts basic unit operation data and unit operation data for each device based on the event log designated in step S110.

Subsequently, in step S112, the integrated display output interface 13 acquires the start time, end time, and operation intention of each unit operation based on the unit operation data extracted in step S111.

Subsequently, in step S113 the integrated display output interface 13 calculates the duration of each unit operation based on the start time and end time acquired in step S112.

Subsequently, in step S114, the integrated display output interface 13 generates a unit operation band, for each unit operation, that has the duration calculated in step S113 and has the operation intention acquired in step S112 appended thereto.

Subsequently, in step S115, the integrated display output interface 13 classifies the unit operation bands generated in step S114 into lanes by device and arranges the operation unit bands in a time series.

On the other hand, in step S116, the user designates a historian and a device that are to be analyzed. The device may be designated by the designation of a tag name.

Subsequently, in step S117, the process data analyzer 12 acquires process data for each device based on the historian and tag designated in step S116.

Subsequently, in step S118, the integrated display output interface 13 generates a process trend chart for each device based on the process data acquired in step S117.

Subsequently, in step S119, the integrated display output interface 13 classifies the process trend charts generated in step S118 into lanes by device. The processing then proceeds to step S120.

In step S120, the integrated display output interface 13 matches the time axes of the above-described unit operation bands and process trend charts and generates an integrated display including the unit operation bands and the process trend charts.

Subsequently, in step S121, the integrated display output interface 13 outputs the integrated display generated in step S120 to the display apparatus 14.

Furthermore, in accordance with user (analyst) designation, the integrated display output interface 13 may generate the above-described operation trend charts based on the unit operation data extracted in step S111. In this case, the integrated display output interface 13 can match the time axes of the generated operation trend charts and the above-described unit operation bands and process trend charts and display the generated operation trend charts at a position easy for the user to recognize in the integrated display (for example the uppermost lanes).

The present embodiment visualizes operations by an operator and changes in process values associated by time (specifically, on the same time, axis), thereby allowing the relationship between operations by the operator and changes in process values to be grasped easily. For example, this facilitates improved operation of a plant or the like. In greater detail, a sudden change occurs in the process trend charts 21, 22 in FIG. 2. The user can refer to the operation trend chart 28 to grasp that manual operations before the sudden change are the cause. This information leads to improvement of subsequent operations.

Second Embodiment

Figure 4:
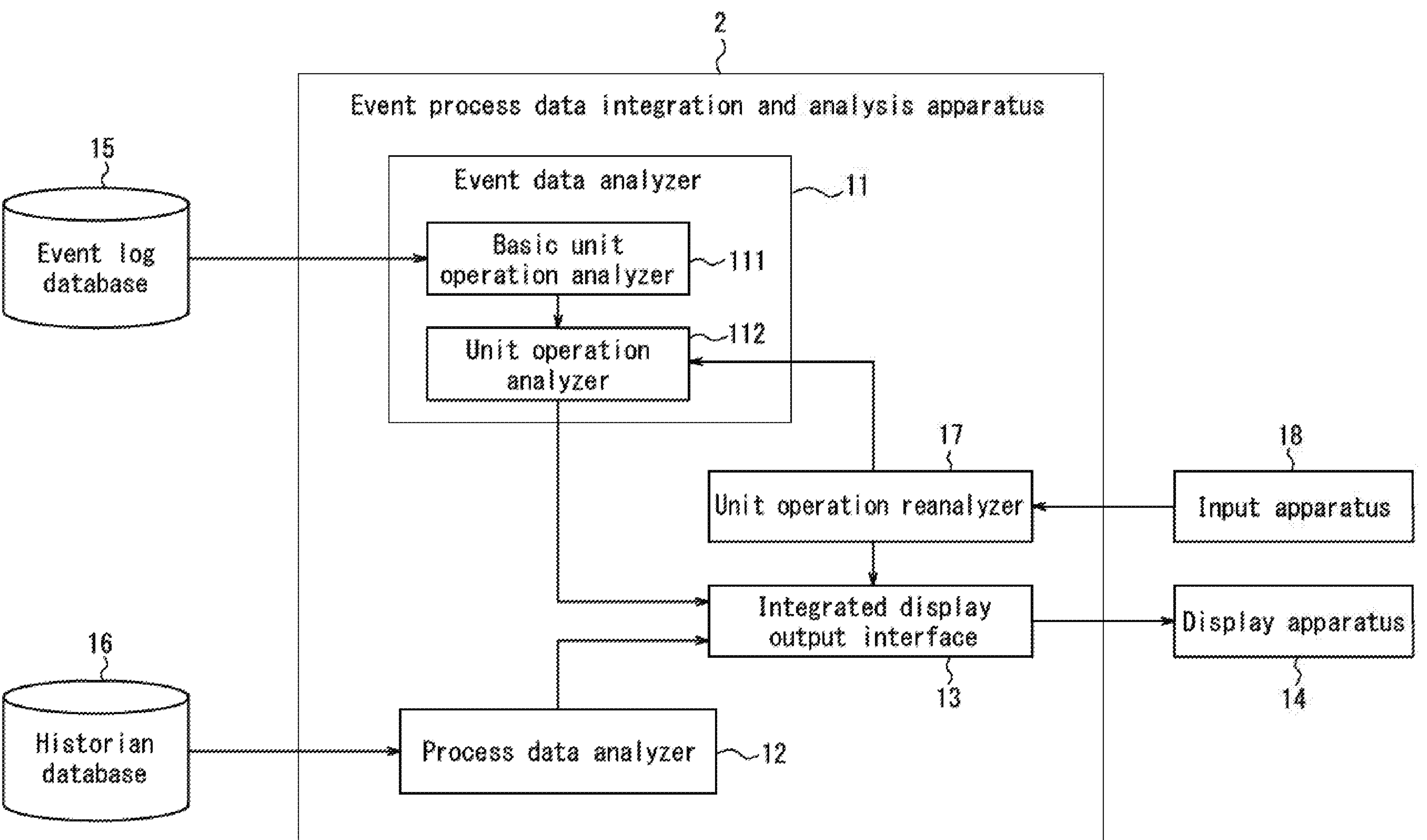
FIG. 4 is a functional block diagram illustrating the functions of an event process data integration and analysis apparatus according to a second embodiment.

As illustrated in FIG. 4, an event process data integration and analysis apparatus 2 according to a second embodiment of the present disclosure includes an event data analyzer 11, a process data analyzer 12, an integrated display output interface 13, and a unit operation reanalyzer 17. The event data analyzer 11, the process data analyzer 12, and the integrated display output interface 13 of the present embodiment are respectively similar to the event data analyzer 11, the process data analyzer 12, and the integrated display output interface 13 of the first embodiment.

The unit operation reanalyzer 17 can, for example, include a processing apparatus such as a CPU. The unit operation reanalyzer 17 can include various memories capable of storing programs and data necessary for the processing apparatus to operate. Examples of the memory include ROM, flash memory, and DRAM, which is capable of temporarily storing data. The unit operation reanalyzer 17 can thereby execute the programs.

In general, a plurality of devices are targeted for operations by an operator. Therefore, it would be more convenient for the user if operations by an operator on a plurality of devices could be collectively analyzed. Examples of collectively analyzing operations by an operator include a desire to gain a rough understanding of whether a particular operation has been performed on a plurality of devices and a desire to gain an understanding of whether a certain operation that should be performed simultaneously on a plurality of devices has actually been performed on the devices. The combination used in the former case is referred to as "OR combination", and the combination used in the latter case is referred to as "AND combination". The "OR combination" displays a plurality of unit operations in a single lane without merging (for example displaying three unit operations separately so that each, operation is visible), whereas the "AND combination" displays a plurality of unit operations merged (for example, three unit operations displayed as one) in a single lane. The "OR combination" is preferably used when analysis of operator operations or the like over a long time scale (such as several hours to several tens of hours) is desired. The "AND combination" is preferably used when analysis of operator operations or the like over a short time scale (such as several minutes to several hours) is desired. "Simultaneously" is not limited to an exact mathematical match between the periods (time slots) in which each unit operation is performed but rather includes the case of a certain percentage of overlap between these periods (time slots). The percentage considered to be simultaneous is 50% by default but can be set appropriately. The user can select the devices to be analyzed collectively and the combination method (OR combination or AND combination) via an input apparatus 18.

In the case of OR combination, the integrated display output interface 13 generates OR combined unit operation hands by arranging the unit operation bands of the devices targeted for OR combination in overlap in one lane (i.e. in the same lane). The integrated display output interface 13 outputs, to the display apparatus 14, an integrated display including the generated OR combined unit operation bands and process trend charts generated by a method similar to that of the first embodiment. Details of integrated display for the case of OR combination are provided below with reference to FIG. 5.

Figure 5:
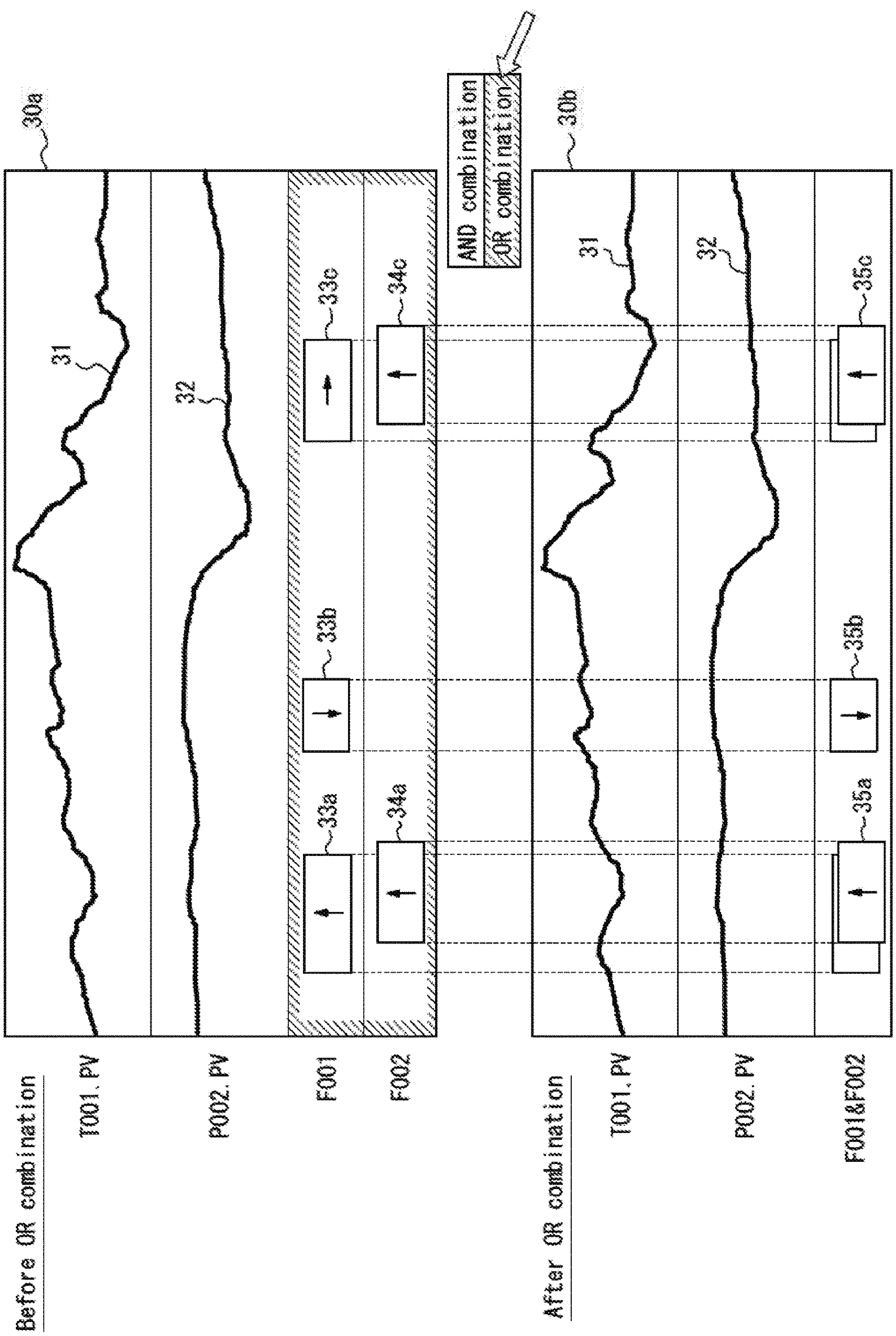
FIG. 5 illustrates an example of an integrated display OR combination) generated by the event process data integration and analysis apparatus of FIG. 4.

FIG. 5 illustrates an integrated display 30*a* before OR combination and an integrated display 30*b* after OR combination for the case of performing OR combination on the unit operation bands of the device (F001) and the unit operation bands of the device (F002). The integrated display 30*b* after OR combination includes an OR combined unit operation band 35*a* generated by OR combination of the unit operation hand 33*a* of the device (Fool) and the unit operation band 34*a* of the device (F002) and an OR combined unit operation band 35*c* generated by OR combination of the unit operation band 33*c* of the device (F001) and the unit operation band 34*c* of the device (F002). The unit operation band 33*b* of the device (F001) directly becomes the OR combined unit operation band 35*b*, since no unit operation band of the device (F002) exists at the same time. The unit operation reanalyzer 17 need not be used when performing OR combination.

On the other hand, in the case of performing AND combination, the unit operation reanalyzer 17 selects simultaneous unit operation bands from an the unit operation bands of the devices that are targeted for AND combination. The integrated display output interface 13 generates AND combined unit operation bands by combining the selected unit operation bands with each other and arranging the result in one lane (i.e. in the same lane). The integrated display output interface 13 outputs, to the display apparatus 14, an integrated display including the generated AND combined unit operation bands and process trend charts generated by a method similar to that of the first embodiment.

In greater detail, the unit operation reanalyzer 17 refers to the unit operation data of the event data analyzer 11 and analyzes the start time, end time, device count, and operation intention of all of the unit operations targeted for AND combination. The integrated display output interface 13 generates an AND combined unit operation band based on the analysis results of the unit operation reanalyzer 17. The duration of the "AND combined unit operation hand" can be the time from the start time of the first (earliest) unit operation to the end time of the last (latest) unit operation among the plurality of unit operations targeted for AND combination. While details are provided below, the "AND combined unit operation hand" includes the device count of devices targeted for the AND combination and the operation intention. Details of integrated display for the case of AND combination are provided below with reference to FIG. 6.

Figure 6:
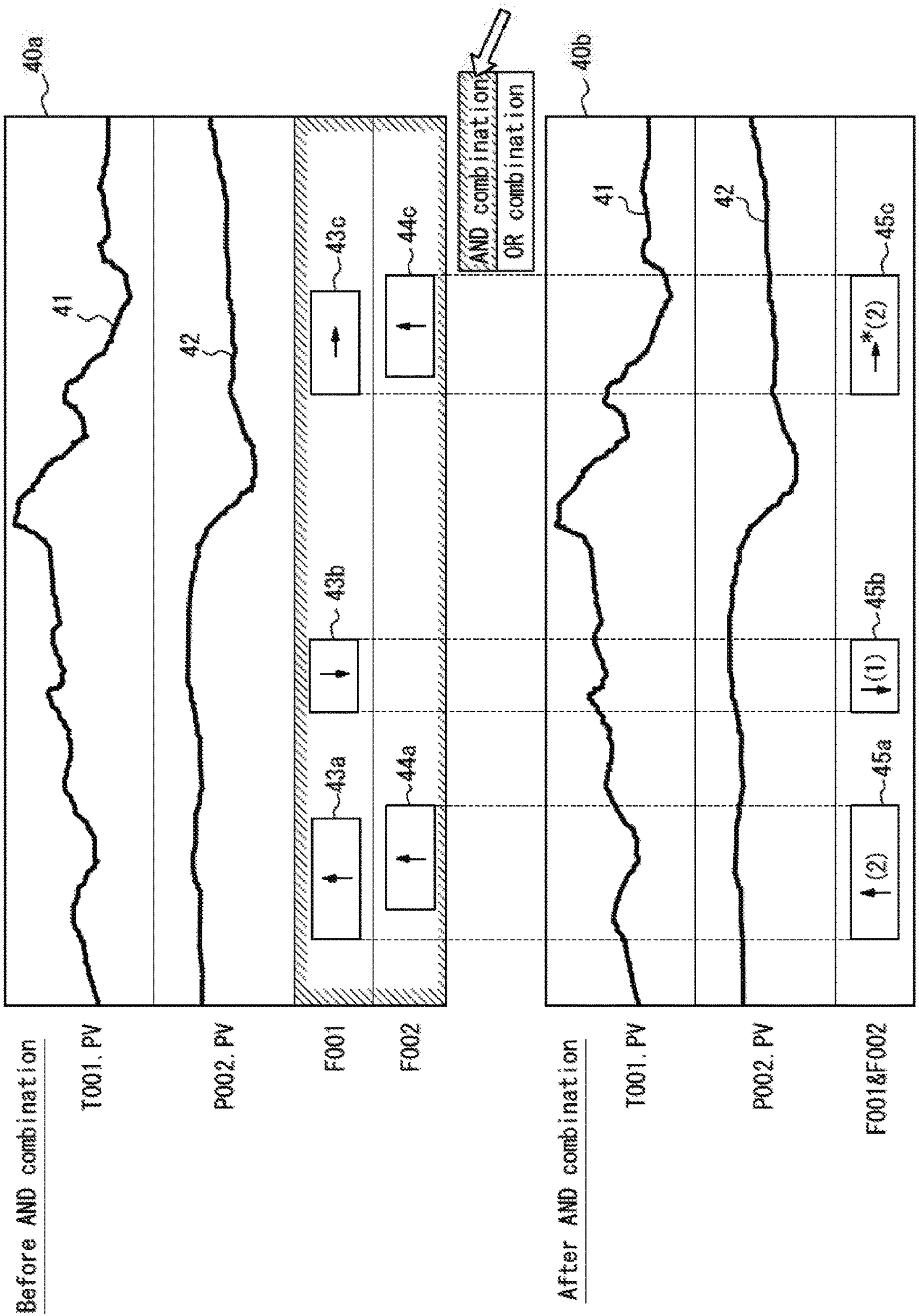
FIG. 6 illustrates an example of an integrated display (AND combination) generated by the event process data integration and analysis apparatus of FIG. 4.

FIG. 6 illustrates an integrated display 40*a* before AND combination and an integrated display 40*b* after AND combination for the case of performing AND combination on the unit operation bands of the device (F001) and the unit operation bands of the device (F002). The integrated display 40*b* after AND combination includes an AND combined unit operation band 45*a* generated by AND combination of the unit operation hand 43*a* of the device (F001) and the unit operation band 44*a* of the device (F002) and an AND combined unit operation band 45*c* generated by AND combination of the unit operation band 43*c* of the device (F001) and the unit operation band 44*c* of the device (F002). The unit operation band 43*b* of the device (F001) directly becomes the AND combined unit operation band 45*b*, since no unit operation band of the device (F002) exists at the same time. Additionally, "up arrow (2)" is appended to the AND combined unit operation band 45*a*. This makes it clear that the same unit operation with the operation intention "up arrow" was performed simultaneously on the device (F001) and the device (F002). "Down arrow (1)" is appended to the AND combined unit operation band 45*b*. This makes it clear that a unit operation with an operation intention of "decrease" was performed on the device (F001), whereas the same unit operation, which should have been performed simultaneously on the device (F002), was not performed on the device (F002). The user is thereby alerted. "Right arrow *(2)" is appended to the AND combined unit operation band 45*c*. Here, a unit operation with an operation intention of "minute adjustment" is performed on the device (F001). On the other hand, a unit operation with an operation intention of "increase" is performed on the device (F002). The amount of change in the process value of the device (F001), however, is greater than the amount of change in the process value of the device (F002). The operation intention of the device (F001), which has the greater amount of change in the process value, is therefore appended on a priority basis to the AND combined unit operation band 45*c*. An arbitrary symbol ("*" in FIG. 6) is appended to the AND combined unit operation band 45*c* to alert the user that the operation intention differs between devices. Any display method for alerting the user may be adopted, such as changing the display color of the AND combined unit operation hand 45*c* instead of appending the symbol "*".

Figure 7:
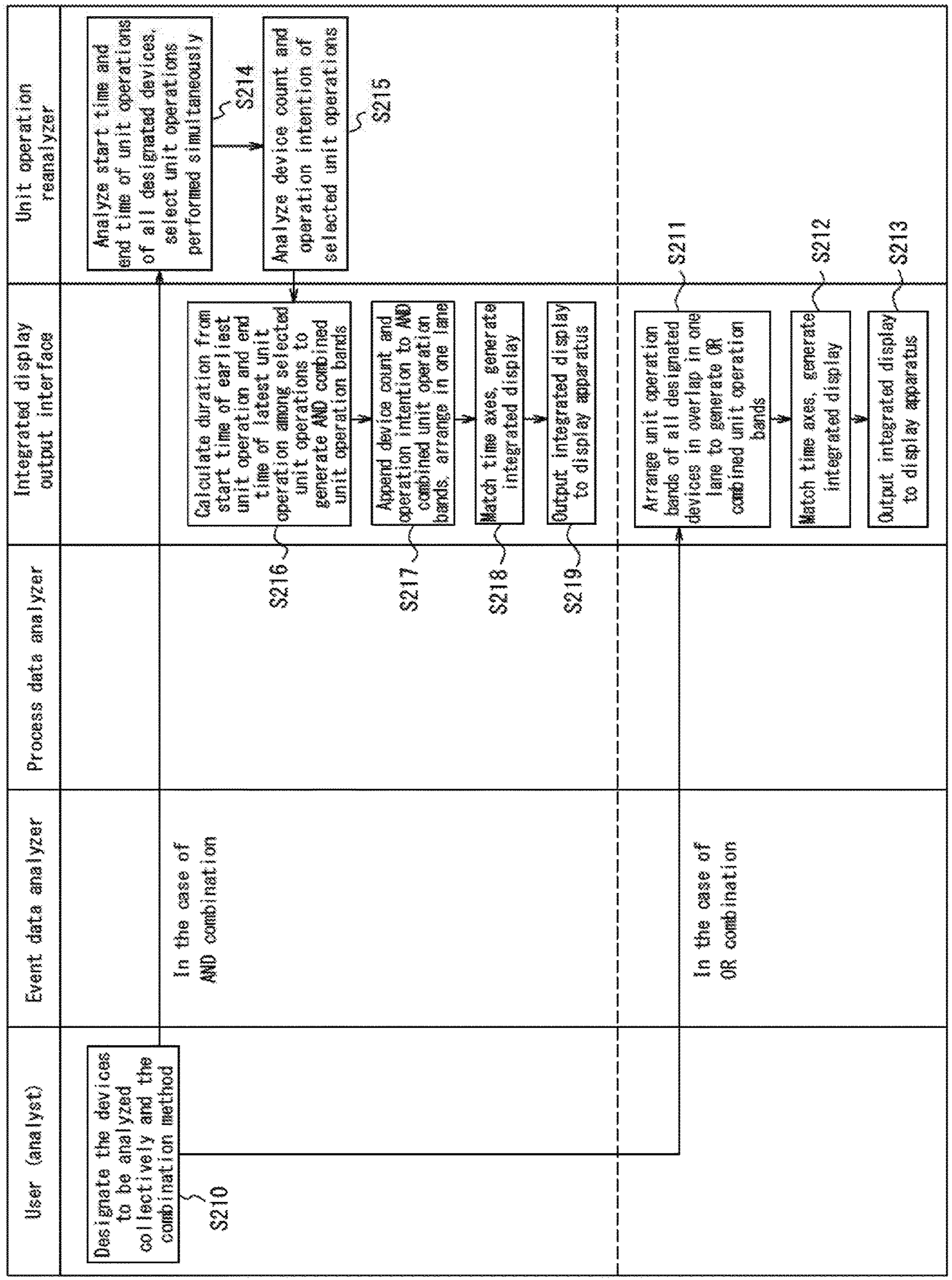
FIG. 7 is a flowchart illustrating an example of processing by the event process data integration and analysis apparatus of FIG. 4.

Next, an example of processing by the event process data integration and analysis apparatus 2 according to the present embodiment is described in detail with reference to FIG. 7.

In step S210, the user designates a plurality of devices to be analyzed collectively and the combination method (OR combination or AND combination). When the combination method is OR combination, the processing proceeds to step S211. When the combination method is AND combination, the processing proceeds to step S214.

When step S211 is reached (in the case of OR combination), the integrated display output interface 13 generates OR combined unit operation bands by arranging the unit operation bands of the devices designated in step S210 in overlap in one lane.

Subsequently, in step S212, the integrated display output interface 13 matches the time axes of the OR combined unit operation bands generated in step S211 and process trend charts generated as in the first embodiment. In this way, the integrated display output interface 13 generates an integrated display including the OR combined unit operation bands and the process trend charts.

Subsequently, in step S213, the integrated display output interface 13 outputs the integrated display generated in step S212 to the display apparatus 14.

On the other hand, when step S214 is reached (in the case of AND combination), the unit operation reanalyzer 17 analyzes the start time and end time of the unit operations of all of the devices designated in step S210 and selects unit operations performed simultaneously.

Subsequently, the unit operation reanalyzer 17 analyzes the device count and the operation intention of the unit operations selected in step S214 and transmits the analysis results to the integrated display output interface 13.

Subsequently, in step S216, the integrated display output interface 13 receives the analysis results of steps S214, S215 from the unit operation reanalyzer 17 and generates AND combined unit operation bands based on the received analysis results. The duration of the AND combined unit operation band can be the time from the start time of the earliest unit operation to the end time of the latest unit operation among the unit operations.

Subsequently, in step S217, the integrated display output interface 13 appends, based on the analysis results of step S215, the device count and the operation intention to the AND combined unit operation bands generated in step S216 and arranges the AND combined unit operation bands in one lane.

Subsequently, in step S218, the integrated display output interface 13 matches the time axes of the AND combined unit operation bands arranged in step S217 and process trend charts generated as in the first embodiment. In this way, the integrated display output interface 13 generates an integrated display including the AND combined unit operation bands and the process trend charts.

Subsequently, in step S219, the integrated display output interface 13 outputs the integrated display generated in step S218 to the display apparatus 14.

The present embodiment can improve user convenience through collective analysis of a plurality of tags. The use of OR combination enables the user to gain a rough understanding of whether a particular operation has been performed on a plurality of devices. Furthermore, the Use of AND combination enables the user to gain an understanding of whether a certain operation that should be performed simultaneously on a plurality of devices has been performed on the devices. This enables a clear understanding of lacking operations and of differences in operation intention.

The present disclosure is based on drawings and embodiments, but it should be noted that a person of ordinary skill in the art could easily make a variety of modifications and adjustments on the basis of the present disclosure Therefore, such changes and modifications are to be understood as included within the scope of the present disclosure. For example, the functions and the like included in the various steps and the like may be reordered in any logically consistent way. Furthermore, steps and the like may be combined into one or divided.

In the first and second embodiments, the case of the event data analyzer 11 and the process data analyzer 12 being included in the event process data integration and analysis apparatuses 1, 2 was described. An external apparatus including functions similar to at least one of the event data analyzer and the process data analyzer may, however, be used. In this case, the integrated display output interface 13 receives data analyzed by the functions of the external apparatus and generates the integrated display.

The unit operation bands have a rectangular shape in the first and second embodiments, but this example is not limiting. Furthermore, the method of presenting information on the operation intention in the unit operation band is not limited to symbols such as "up arrow", "down arrow", and "right arrow". The information on the operation intention in the unit operation band may, for example, be displayed by characters, numbers, graphics, symbols, or a combination thereof.

The integrated display has been described as including operation trend charts in the first and second embodiments, but this example is not limiting. For example, the integrated display may include only unit operation bands and process trend charts.

Analysis may be performed offline or online in the present disclosure. For example, when an operation is performed on a certain device, an integrated display output interface may detect the time difference from when an operation was last performed on the device and analyze, in real time, whether the unit operation bands can be grouped together as one unit operation band. When the unit operation bands can be grouped together, the integrated display output interface may combine and display the unit operation bands by, for example, extending the duration of the unit operation bands. Conversely, when the unit operation bands cannot be grouped together, the integrated display, output interface may display the unit operation bands separately.

INDUSTRIAL APPLICABILITY

The present disclosure can provide an event process data integration and analysis apparatus and an event process data integration and analysis method that can improve the convenience of a technique for displaying information related to operations by an operator and variation in process values.

The invention claimed is:

1. An event process data integration and analysis apparatus comprising:

an event data analyzer including a processing apparatus, the event data analyzer configured to extract unit operation data based on an event log including a history of an operation of an operator;

a process data analyzer including a processing apparatus, the process data analyzer configured to extract process data based on a historian including a history of a process value; and an integrated display output interface including a processing apparatus, the integrated display output interface configured to generate, based on the unit operation data, a unit operation band for each device among a plurality of devices, the unit operation band including a representation of an operation intention of the operator for a series of operations to change the process value and being arranged in a time series, wherein the operation intention is information which includes increase, decrease, or minute adjustment of the process value;

generate, based on the process data, a process trend chart for each device, the process trend chart representing a change over time in the process value; and generate an integrated display that displays the unit operation band and the process trend chart associated by time.

2. The event process data integration and analysis apparatus of claim 1, wherein the integrated display output interface is configured to generate, based on the unit operation data, an operation trend chart for each device, the operation trend chart representing a change over time in operations by the operator; and generate the integrated display to include the unit operation band, the operation trend chart, and the process trend chart associated by time.

3. The event process data integration and analysis apparatus of claim 1, wherein for a plurality of devices designated by a user, the integrated display output interface is configured to generate a combined unit operation band by arranging the unit operation bands of the plurality of devices together in one lane; and generate an integrated display including the combined unit operation band.

4. The event process data integration and analysis apparatus of claim 3, wherein the integrated display output interface is configured to generate the combined unit operation band by arranging the unit operation bands of the devices in overlap in one lane.

5. The event process data integration and analysis apparatus of claim 3, further comprising:

a unit operation reanalyzer configured to select simultaneous unit operation bands from among the unit operation bands of the devices;

wherein the integrated display output interface is configured to generate the combined unit operation band by arranging the selected unit operation bands in combination in one lane.

6. The event process data integration and analysis apparatus of claim 5, wherein the unit operation reanalyzer is configured to analyze a device count of the selected unit operation bands and the operation intention represented by the selected unit operation bands; and the integrated display output interface is configured to append the device count and the operation intention to the combined unit operation band based on a result of analysis by the unit operation reanalyzer.

7. The event process data integration and analysis apparatus of claim 5, wherein the integrated display output interface is configured to generate the combined unit operation band by arranging the selected unit operation bands into one unit operation band in one lane.

8. The event process data integration and analysis apparatus of claim 6, wherein the combined unit operation band includes a representation that indicates the operation intentions differ among the selected unit operation bands.

9. The event process data integration and analysis apparatus of claim 1, wherein the process value is changed by the operation of the operator.

10. An event process data integration and analysis method comprising using an event data analyzer, a process data analyzer, and an integrated display output interface to:

extract unit operation data based on an event log including a history of an operation of an operator;

extract process data based on a historian including a history of a process value;

generate, based on the unit operation data, a unit operation band for each device among a plurality of devices, the unit operation band including a representation of an operation intention of the operator for a series of operations to change the process value and being arranged in a time series, wherein the operation intention is information which includes increase, decrease, or minute adjustment of the process value;

generate, based on the process data, a process trend chart for each device, the process trend chart representing a change over time in the process value; and generate an integrated display that displays the unit operation band and the process trend chart associated by time.

* * * * *